UNITED STATES PATENT OFFICE.

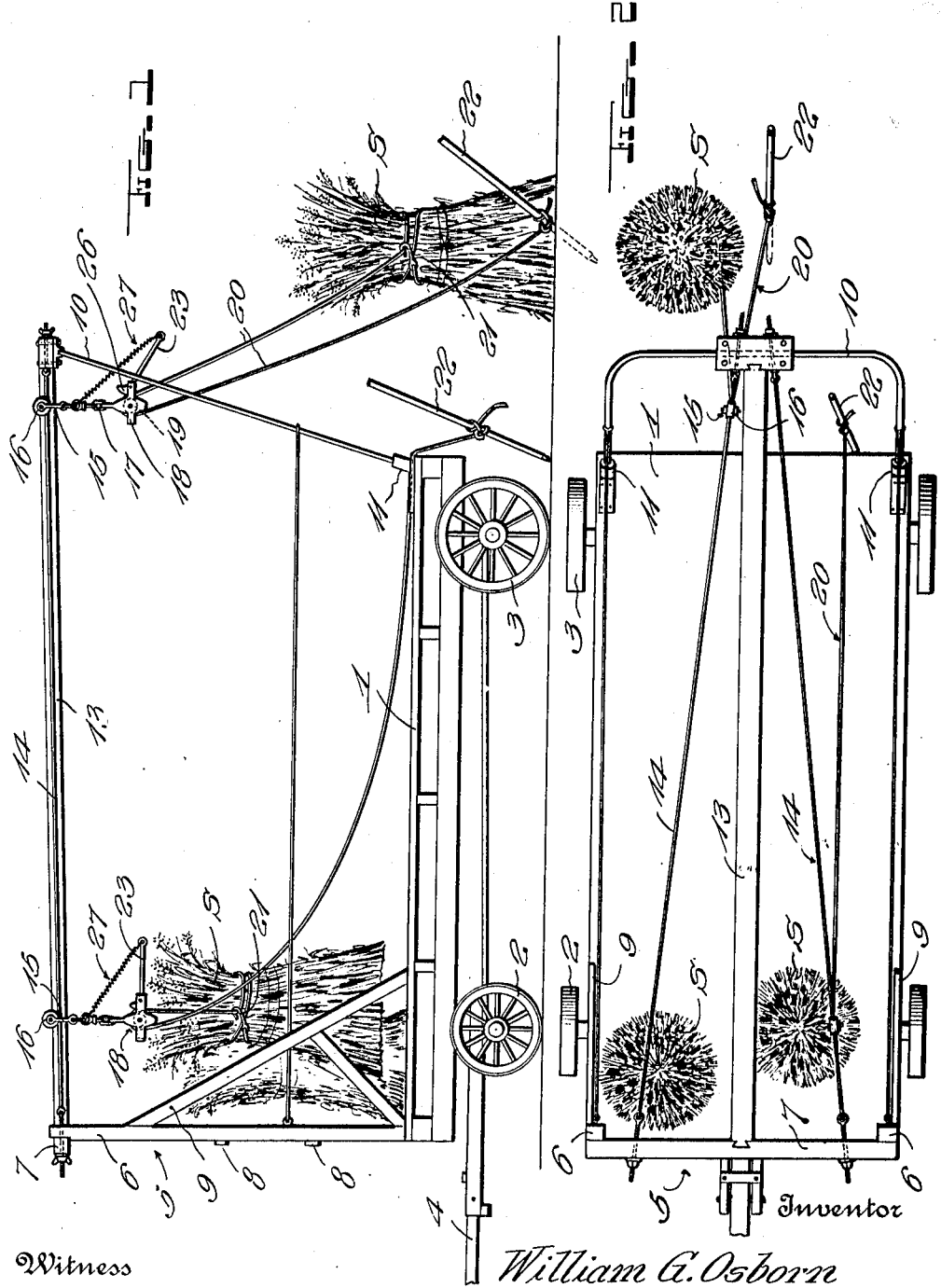

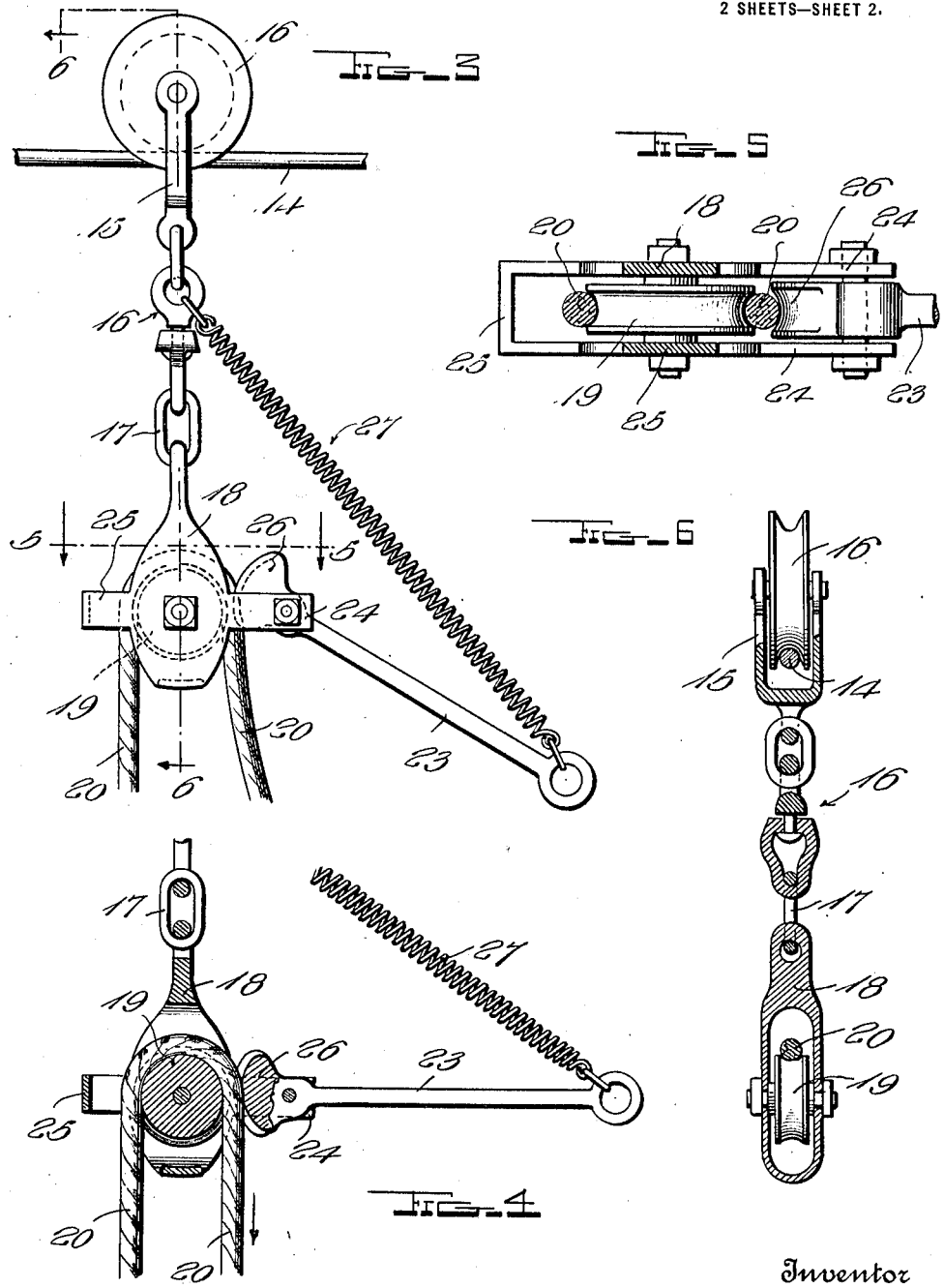

WILLIAM GARY OSBORN, OF GARY, INDIANA.

SHOCK LOADING AND HOISTING TRUCK.

1,314,694. Specification of Letters Patent. Patented Sept. 2, 1919.

Application filed July 29, 1918. Serial No. 247,284.

*To all whom it may concern:*

Be it known that I, WILLIAM GARY OSBORN, a citizen of the United States, residing at Gary, in the county of Lake and State of Indiana, have invented certain new and useful Improvements in Shock Loading and Hoisting Trucks; and I do declare the following to be a full, clear, and exact description of the invention, such as will enable others skilled in the art to which it appertains to make and use the same.

My invention has for its object to provide a simple and inexpensive, yet a highly efficient and desirable truck for loading corn shocks and the like and hauling them from the field as required; and with this object in view, the invention resides in the novel features of construction and unique combination of parts hereinafter fully described and claimed, reference being made to the accompanying drawings forming a part of this specification and in which:

Figure 1 is a side elevation of the invention;

Fig. 2 is a top plan view thereof;

Fig. 3 is an enlarged side elevation of one of the carriages mounted on the longitudinal tracks and carrying the sheaves over which the hoisting cables pass;

Fig. 4 is a sectional view showing more particularly the cable brake employed on the carriages;

Fig. 5 is a horizontal section on the plane indicated by the lines 5—5 of Fig. 3; and Fig. 6 is a vertical section on the plane of the line 6—6 of Fig. 3.

In the drawings above briefly described, the numeral 1 designates a platform suitably supported on front and rear wheels 2 and 3, the axle of said front wheels being provided with an appropriate tongue 4 for hitching a team or tractor thereto. A front frame 5 rises from the front end of platform 1 and consists of vertical standards 6, a transverse crown bar 7, slats or the like 8 extending between said standards, and suitable braces 9 for the latter. An arched rear frame 10, by preference formed of a single metal bar, rises from the rear end of platform 1 and inclines upwardly and rearwardly to a point spaced considerably in rear of the platform, the lower ends of the frame 10 being by preference received in sockets 11 carried by said platform. A central longitudinal stringer 13 extends between the crown bars of the frames 5 and 10 and is suitably secured thereto, and a pair of longitudinal tracks 14 of wire cable, rods or the like, also lead from one crown bar to the other, said tracks being located one on each side of the stringer 13 and diverging forwardly from the intermediate portion of the frame 10 to the outer portions of frame 7.

The front and rear frames 5 and 10, and the stringer 13, coöperate in forming a supporting frame for the tracks 14 which locate the rear ends of said tracks considerably in rear of the platform 1, whereby to permit hoisting of the shocks of corn or the like without the platform obstructing the hoisting operation, as will be hereinafter described.

Carriages 15 are provided with grooved wheels 16 mounted on the tracks 14, and by means of swivels 16 and links or the like 17, the upper ends of yokes 18 are connected to said carriages, said yokes having sheaves 19 over which a pair of hoisting cables 20 pass. One end of the cables 20 is provided with a hook 21 or other preferred means for attaching it to the shocks S, while the other ends of said cables, are provided with stakes 22 or other suitable land anchors. When the carriages 15 are positioned at the extreme rear ends of the tracks 14, the cables may be connected at one end to the shocks S as shown clearly in Figs. 1 and 2, and the land anchors 22 are then engaged with the earth as illustrated. The machine is now pulled forwardly with the result that the shocks are raised slightly above the platform 1. Means yet to be described are provided to hold the cable 20 against movement over the sheaves 19 after raising of the shocks, and it will thus be seen that the shocks may be moved forwardly as required in loading, the carriages 15 then traveling freely along the tracks 14.

The cable holding means above referred to preferably consists of a lever 23 for each yoke 18, said lever being fulcrumed between lateral arms 24 extending from the yoke opposite a cable guard 25. A grooved brake in the form of a cam 26 is carried by the inner end of lever 23 to engage the cable 21 as shown in Fig. 4, while a coiled spring 27 connects the outer end of the lever with the swivel 16 or with any other preferred part of the connections between the wheels 16 and the yoke 18. The spring normally holds the shoe or cam 26 against the cable 21 but permits movement of this cable in a direction to raise the shock. Any tendency of the cable to move in the other direction, however, after the shock has been elevated, is resisted, due to the fact that the cam brake binds against the cable. When the shock has been moved forwardly to the required extent, a downward pull on lever 23 will release the same, thus permitting the shock to be lowered onto the platform. It will be understood that in addition to loading the machine in this manner, the carriages and hoisting cables may also well be used in unloading should this be required.

From the foregoing, taken in connection with the accompanying drawings, it will be obvious that although the present invention is of comparatively simple and inexpensive nature, it will be highly efficient and durable, permitting quick and easy loading of the shocks without disintegrating them. Since probably the best results are obtained from the arrangement shown and described, such arrangement is preferably followed, but within the scope of the invention as claimed, considerable latitude is allowed for making such changes as occasion may dictate.

I claim:

1. In a shock loading and hauling truck, a wheeled platform, a frame rising from said platform and including an elevated longitudinal track whose rear end projects beyond the rear end of said platform, a carriage movable along said track and carrying a sheave, a hoisting cable trained over said sheave and having means at one end for attaching it to the shock, and a land anchor on the other end of said cable.

2. In a shock loading and hauling truck, a wheeled platform, a front frame rising therefrom, a rear arched frame rising from the rear end of said platform, and extending upwardly and rearwardly to a point spaced in rear of said platform, a central longitudinal stringer extending between the upper ends of said front and rear frames, longitudinal tracks on opposite sides of said stringer and diverging forwardly from the upper end of said rear frame to the upper end of said front frame, carriages mounted on said tracks and each carrying a sheave, hoisting cables trained over said sheaves and having means at one end for attaching the shocks thereto, land anchors on the other ends of said cables, and means for holding said cables against movement over said sheaves when the shocks are raised.

In testimony whereof I have hereunto set my hand.

WILLIAM GARY OSBORN.

Copies of this patent may be obtained for five cents each, by addressing the "Commissioner of Patents, Washington, D. C."